US012677187B2

(12) United States Patent
Zou et al.

(10) Patent No.: US 12,677,187 B2
(45) Date of Patent: Jul. 7, 2026

(54) DATA BURST VOLUME INDICATION FOR TSC

(71) Applicant: Telefonaktiebolaget LM Ericsson (publ), Stockholm (SE)

(72) Inventors: Zhenhua Zou, Solna (SE); Jonas Fröberg Olsson, Ljungsbro (SE); Torsten Dudda, Wassenberg (DE); Yufei Blankenship, Kildeer, IL (US); Bikramjit Singh, Raasepori (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 18/568,028

(22) PCT Filed: Jun. 6, 2022

(86) PCT No.: PCT/IB2022/055258
§ 371 (c)(1),
(2) Date: Dec. 7, 2023

(87) PCT Pub. No.: WO2022/259123
PCT Pub. Date: Dec. 15, 2022

(65) Prior Publication Data
US 2024/0284241 A1     Aug. 22, 2024

Related U.S. Application Data

(60) Provisional application No. 63/197,624, filed on Jun. 7, 2021.

(51) Int. Cl.
*G06F 15/173*          (2006.01)
*H04W 28/02*          (2009.01)

(52) U.S. Cl.
CPC .............................. *H04W 28/0268* (2013.01)

(58) Field of Classification Search
CPC ..... H04W 28/0268; H04L 47/00; H04L 47/24
See application file for complete search history.

(56) References Cited

U.S. PATENT DOCUMENTS

2010/0202475 A1     8/2010   Nakazumi
2012/0142360 A1     6/2012   Puthenpura et al.
(Continued)

FOREIGN PATENT DOCUMENTS

CN          112235833 A       1/2021
WO        2019214524 A1     11/2019
(Continued)

OTHER PUBLICATIONS

Author Unknown, "Technical Specification Group Services and System Aspects; Study on XR (Extended Reality) and media services (Release 18)," Technical Report 23.700-60, Version 1.0.0, Sep. 2022, 3GPP Organizational Partners, 261 pages.
(Continued)

*Primary Examiner* — Padma Mundur
(74) *Attorney, Agent, or Firm* — Withrow & Terranova, PLLC

(57)                    ABSTRACT

Systems and methods are disclosed for data burst volume indication for Time Sensitive Communication (TSC). In one embodiment, a method performed by Radio Access Network (RAN) node comprises receiving, from a core network (CN) node, one or more parameters, in additional to a maximum data burst volume (MDBV) parameter, that describe one or more data volume characteristics of a Quality of Service (QoS) flow. In this manner, compared to always assuming the worst-case scenario with the MDBV, the RAN node has a more accurate understanding of the traffic characteristics, which allows the RAN node to optimally schedule radio resources to cater to the data volume.

27 Claims, 8 Drawing Sheets

RAN NODE
500

CN NODE
502

504. PARAMETER(S), IN ADDITION TO MDBV, THAT MORE ACCURATELY DESCRIBE DATA VOLUME CHARACTERISTIC (E.G., OF A NON-GBR QoS FLOW OR A GBR QoS FLOW, E.G., OF DELAY-CRITICAL OR NON-DELAY-CRITICAL RESOURCE TYPE). FOR EXAMPLE, THE PARAMETER(S) MAY BE PROVIDED AS TSCAI AND/OR AS QoS PARAMETER(S)

PERFORM ONE OR MORE OPERATIONAL TASKS BASED ON THE PARAMETER(S)
506

(56) References Cited

U.S. PATENT DOCUMENTS

| | | | | |
|---|---|---|---|---|
| 2019/0246420 A1 | 8/2019 | Park et al. | | |
| 2019/0320362 A1* | 10/2019 | Liu | ................... | H04W 28/16 |
| 2020/0137615 A1 | 4/2020 | Joseph et al. | | |
| 2020/0296438 A1 | 9/2020 | Li et al. | | |
| 2020/0383004 A1 | 12/2020 | Hande et al. | | |
| 2021/0235399 A1* | 7/2021 | Wich | ............... | H04W 28/0268 |
| 2021/0368519 A1* | 11/2021 | Liu | .................. | H04W 72/543 |
| 2023/0042506 A1* | 2/2023 | Kahn | ............... | H04W 28/0278 |
| 2023/0413204 A1 | 12/2023 | Babaei | | |

FOREIGN PATENT DOCUMENTS

| | | | |
|---|---|---|---|
| WO | 2019217530 A1 | 11/2019 | |
| WO | 2020067978 A1 | 4/2020 | |
| WO | 2020088603 A1 | 5/2020 | |
| WO | 2020248709 A1 | 12/2020 | |
| WO | 2022089752 A1 | 5/2022 | |
| WO | 2022235199 A1 | 11/2022 | |

OTHER PUBLICATIONS

Author Unknown, "Technical Specification Group Services and System Aspects; Service requirements for cyber-physical control applications in vertical domains; Stage 1 (Release 17)," Technical Specification 22.104, Version 17.5.0, Mar. 2021, 3GPP Organizational Partners, 76 pages.

Author Unknown, "Technical Specification Group Services and System Aspects; System architecture for the 5G System (5GS); Stage 2 (Release 16)," Technical Specification 23.501, Version 16.1.0, Jun. 2019, 3GPP Organizational Partners, 368 pages.

Author Unknown, "Technical Specification Group Services and System Aspects; System architecture for the 5G System (5GS); Stage 2 (Release 17)," Technical Specification 23.501, Version 17.0.0, Mar. 2021, 3GPP Organizational Partners, 489 pages.

Author Unknown, "Technical Specification Group Services and System Aspects; Procedures for the 5G System (5GS); Stage 2 (Release 17)," Technical Specification 23.502, Version 17.0.0, Mar. 2021, 3GPP Organizational Partners, 646 pages.

Author Unknown, "Technical Specification Group Radio Access Network; NR; NR and NG-RAN Overall Description; Stage 2 (Release 16)," Technical Specification 38.300, Version 16.5.0, Mar. 2021, 3GPP Organizational Partners, 151 pages.

Huawei, "R3-196927: (TP for NR_IIOT BL CR for TS 38.413): TSC Assistance Information," 3GPP TSG-RAN3 Meeting #106, Nov. 18-22, 2019, Reno, Nevada, 9 pages.

Nokia, "RP-213587: New SID 'Study on XR Enhancements for NR'," 3GPP TSG RAN Meeting #94e, Dec. 6-17, 2021, Electronic Meeting, 5 pages.

International Search Report and Written Opinion for International Patent Application No. PCT/SE2022/050448, mailed Jun. 16, 2022, 9 pages.

International Search Report and Written Opinion for International Patent Application No. PCT/IB2022/055258, mailed Aug. 18, 2022, 16 pages.

Written Opinion for International Patent Application No. PCT/IB2022/055258, mailed May 12, 2023, 8 pages.

International Preliminary Report on Patentability for International Patent Application No. PCT/IB2022/055258, mailed Sep. 8, 2023, 24 pages.

Apple, "R2-2100856: Scheduling Assistance Information for support of new QoS," 3GPP TSG-RAN WG2 Meeting #113-e, Jan. 25-Feb. 5, 2021, Electronic Meeting, 10 pages.

* cited by examiner

DATA BURST VOLUME INDICATION FOR TSC

RELATED APPLICATIONS

This application claims the benefit of provisional patent application Ser. No. 63/197,624, filed Jun. 7, 2021, the disclosure of which is hereby incorporated herein by reference in its entirety.

TECHNICAL FIELD

The present disclosure relates to a wireless communication system and, more specifically, to indication of data burst volume for a Quality of Service (QoS) flow for Time-Sensitive Communication (TSC).

BACKGROUND

Maximum Data Burst Volume (MDBV)

Section 5.7.3.4 of Third Generation Partnership Project (3GPP) Technical Specification (TS) 23.501 V17.0.0 states that:

Each GBR [(Guaranteed Bit Rate)] QoS [(Quality of Service)] Flow with Delay-critical resource type shall be associated with a Maximum Data Burst Volume (MDBV).

MDBV denotes the largest amount of data that the 5G-AN [(Fifth Generation Access Network)] is required to serve within a period of 5G-AN PDB [(Packet Delay Budget)].

Every standardized 5QI [(Fifth Generation (5G) QoS Identifier)] (of Delay-critical GBR resource type) is associated with a default value for the MDBV (specified in QoS characteristics Table 5.7.4.1). The MDBV may also be signalled together with a standardized 5QI to the (R)AN, and if it is received, it shall be used instead of the default value.

The MDBV may also be signalled together with a pre-configured 5QI to the (R)AN, and if it is received, it shall be used instead of the pre-configured value.

Section 5.7.3.1 of 3GPP TS 23.501 V17.0.0 lists the following as 5G QoS characteristics:

Resource Type (GBR, Delay critical GBR or Non-GBR);

Priority Level;

Packet Delay Budget (including Core Network Packet Delay Budget);

Packet Error Rate;

Averaging window (for GBR and Delay-critical GBR resource type only);

Maximum Data Burst Volume (for Delay-critical GBR resource type only).

QoS Overview

Section 12.1 of 3GPP TS 38.300 V16.5.0 provides a QoS overview and is reproduced below.

***Start Excerpt from 3GPP TS 38.300 V16.5.0***

12.1 Overview

The 5G QoS model is based on QoS Flows (see TS 23.501 [3]) and supports both QoS Flows that require guaranteed flow bit rate (GBR QoS Flows) and QoS Flows that do not require guaranteed flow bit rate (non-GBR QoS Flows). At NAS level (see TS 23.501 [3]), the QoS flow is thus the finest granularity of QoS differentiation in a PDU session. A QoS flow is identified within a PDU session by a QoS Flow ID (QFI) carried in an encapsulation header over NG-U.

The QoS architecture in NG-RAN, both for NR connected to 5GC and for E-UTRA connected to 5GC, is depicted in the FIG. 12-1 and described in the following:

For each UE, 5GC establishes one or more PDU Sessions;

Except for NB-IoT, for each UE, the NG-RAN establishes at least one Data Radio Bearers (DRB) together with the PDU Session and additional DRB(s) for QoS flow (s) of that PDU session can be subsequently configured (it is up to NG-RAN when to do so);

If NB-IoT UE supports NG-U data transfer, the NG-RAN may establish Data Radio Bearers (DRB) together with the PDU Session and one PDU session maps to only one DRB;

The NG-RAN maps packets belonging to different PDU sessions to different DRBs;

NAS level packet filters in the UE and in the 5GC associate UL and DL packets with QoS Flows;

AS-level mapping rules in the UE and in the NG-RAN associate UL and DL QoS Flows with DRBs.

[Reproduced Herein as FIG. 1]

FIG. 12-1: QoS Architecture

NG-RAN and 5GC ensure quality of service (e.g. reliability and target delay) by mapping packets to appropriate QoS Flows and DRBs. Hence there is a 2-step mapping of IP-flows to QoS flows (NAS) and from QoS flows to DRBs (Access Stratum).

At NAS level, a QoS flow is characterised by a QoS profile provided by 5GC to NG-RAN and QoS rule(s) provided by 5GC to the UE. The QoS profile is used by NG-RAN to determine the treatment on the radio interface while the QoS rules dictates the mapping between uplink User Plane traffic and QoS flows to the UE. A QoS flow may either be GBR or Non-GBR depending on its profile. The QoS profile of a QoS flow contains QoS parameters, for instance (see TS 23.501 [3]):

For each QoS flow:

A 5G QoS Identifier (5QI);

An Allocation and Retention Priority (ARP).

In case of a GBR QoS flow only:

Guaranteed Flow Bit Rate (GFBR) for both uplink and downlink;

Maximum Flow Bit Rate (MFBR) for both uplink and downlink;

Maximum Packet Loss Rate for both uplink and downlink;

Delay Critical Resource Type;

Notification Control.

NOTE: The Maximum Packet Loss Rate (UL, DL) is only provided for a GBR QoS flow belonging to voice media.

In case of Non-GBR QoS only:

Reflective QoS Attribute (RQA): the RQA, when included, indicates that some (not necessarily all) traffic carried on this QoS flow is subject to reflective quality of service (RQoS) at NAS;

Additional QoS Flow Information.

The QoS parameter Notification Control indicates whether notifications are requested from the RAN when the GFBR can no longer (or again) be fulfilled for a QoS Flow. If, for a given GBR QoS Flow, notification control is enabled and the RAN determines that the GFBR cannot be guaranteed, RAN shall send a notification towards SMF and keep the QoS Flow (i.e. while the NG-RAN is not delivering the requested GFBR for this QoS Flow), unless specific conditions at the NG-RAN require the release of the NG-RAN resources for this GBR QoS Flow, e.g. due to Radio link failure or RAN internal congestion. When applicable, NG- RAN sends a new notification, informing SMF that the GFBR can be guaranteed again.

If Alternative QoS parameters Sets are received with the Notification Control parameter, the NG-RAN may also include in the notification a reference corresponding to the QoS Parameter Set which it can currently fulfil as specified in TS 23.501 [3]. The target NG-RAN node may include in the notification control indication the reference to the QoS Parameter Set which it can currently fulfil over Xn to the source NG-RAN node during handover.

In addition, an Aggregate Maximum Bit Rate is associated to each PDU session (Session-AMBR) and to each UE (UE-AMBR). The Session-AMBR limits the aggregate bit rate that can be expected to be provided across all Non-GBR QoS Flows for a specific PDU Session and is ensured by the UPF. The UE-AMBR limits the aggregate bit rate that can be expected to be provided across all Non-GBR QoS Flows of a UE and is ensured by the RAN (see clause 10.5.1).

The 5QI is associated to QoS characteristics giving guidelines for setting node specific parameters for each QoS Flow. Standardized or pre-configured 5G QoS characteristics are derived from the 5QI value and are not explicitly signalled. Signalled QoS characteristics are included as part of the QoS profile. The QoS characteristics consist for instance of (see TS 23.501 [3]):

Priority level;

Packet Delay Budget (including Core Network Packet Delay Budget);

Packet Error Rate;

Averaging window;

Maximum Data Burst Volume.

At Access Stratum level, the data radio bearer (DRB) defines the packet treatment on the radio interface (Uu). A DRB serves packets with the same packet forwarding treatment. The QoS flow to DRB mapping by NG-RAN is based on QFI and the associated QoS profiles (i.e. QoS parameters and QoS characteristics). Separate DRBs may be established for QoS flows requiring different packet forwarding treatment, or several QoS Flows belonging to the same PDU session can be multiplexed in the same DRB.

In the uplink, the mapping of QoS Flows to DRBs is controlled by mapping rules which are signalled in two different ways:

Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the NG-RAN marks downlink packets over Uu with QFI.

Explicit Configuration: QoS flow to DRB mapping rules can be explicitly signalled by RRC.

The UE always applies the latest update of the mapping rules regardless of whether it is performed via reflecting mapping or explicit configuration.

When a QoS flow to DRB mapping rule is updated, the UE sends an end marker on the old bearer.

In the downlink, the QFI is signalled by NG-RAN over Uu for the purpose of RQoS and if neither NG-RAN, nor the NAS (as indicated by the RQA) intend to use reflective mapping for the QoS flow(s) carried in a DRB, no QFI is signalled for that DRB over Uu. In the uplink, NG-RAN can configure the UE to signal QFI over Uu.

For each PDU session, a default DRB may be configured: if an incoming UL packet matches neither an RRC configured nor a reflective mapping rule, the UE then maps that packet to the default DRB of the PDU session. For non-GBR QoS flows, the 5GC may send to the NG-RAN the Additional QoS Flow Information parameter associated with certain QoS flows to indicate that traffic is likely to appear more often on them compared to other non-GBR QoS flows established on the same PDU session.

Within each PDU session, it is up to NG-RAN how to map multiple QoS flows to a DRB. The NG-RAN may map a GBR flow and a non-GBR flow, or more than one GBR flow to the same DRB, but mechanisms to optimise these cases are not within the scope of standardization.

***End Excerpt from 3GPP TS 38.300 V16.5.0***

Time Sensitive Communication (TSC) and TSC Assistance information (TSCAI)

5G System features can be independently used to enable Time-Sensitive Communication (TSC). One feature is the TSC Assistance Information (TSCAI). TSCAI describes traffic characteristics that may be provided optionally for use by the next generation Node B (gNB) to allow more efficient scheduling of radio resources for periodic traffic and applies to Protocol Data Unit (PDU) session type Ethernet and Internet Protocol (IP).

Additional information regarding TSCAI is described in the following excerpts from Section 5.27 of 3GPP TS 23.501 V17.0.0:

***Start First Excerpt from 3GPP TS 23.501 V17.0.0***

5.27.2 TSC Assistance Information (TSCAI)

5.27.2.1 General

TSC Assistance Information (TSCAI) describes TSC traffic characteristics for use in the 5G System. TSCAI may optionally be used by 5G-AN if provided by SMF. The knowledge of TSC traffic pattern is useful for 5G-AN to allow it to more efficiently schedule periodic, deterministic traffic flows either via Configured Grants, Semi-Persistent Scheduling or with Dynamic Grants.

NEF may determine TSC Assistance Container based on information provided by an AF as in clause 5.27.2.3 and may provide it to PCF for IP type and Ethernet type PDU sessions. In case of integration with IEEE TSN network, TSN AF may determine TSC Assistance Container as described in clause 5.27.2.2 and provide it to PCF for Ethernet PDU sessions in case of integration with IEEE TSN. PCF provides the TSC Assistance Container to SMF as part of PCC rules.

For TSC, the AF provides the traffic pattern parameters such as Burst Arrival Time with reference to the ingress port, Periodicity, Flow Direction and Survival Time to the NEF. The NEF is responsible for forwarding these parameters in TSC Assistance Container to the SMF (via PCF).

SMF binds PCC rules with a TSC Assistance Container as described in clause 6.1.3.2.4 of TS 23.503 [45]. SMF uses the TSC Assistance Container to derive TSCAI as defined in Table 5.27.2-1 on a per QoS Flow basis and sends it to NG-RAN. The Periodicity, Burst Arrival Time, and Survival Time components of the TSCAI that the SMF signals to the NG-RAN are specified with respect to the 5G clock. The SMF may update the TSCAI to NG-RAN as part of handover procedure as defined in TS 23.502 [3] clauses 4.9.1.2.2 and 4.9.1.3.2. The SMF is responsible for mapping the Burst Arrival Time and Periodicity from an external clock (when available) to the 5G clock based on the time offset and cumulative rateRatio between the external clock time and 5GS time as measured and reported by the UPF. The SMF may correct the TSCAI based on the UPF report for time offset and cumulative rateRatio between external PTP time and 5GS time as measured and reported by the UPF.

Survival Time may be provided by TSN AF/AF either in terms of maximum number of messages or in time units, where a time unit is equivalent to the Periodicity. During a single period, single burst is expected. If Survival Time is provided in terms of maximum number of messages, the SMF coverts it into time units by multiplying its value by the Periodicity provided in the TSCAI Container. The SMF corrects the Survival Time in time units by the previously received cumulative rateRatio from the UPF and sets the TSCAI Survival Time to the corrected value.

TABLE 5.27.2-1

TSC Assistance Information (TSCAI)

| Assistance Information | Description |
| --- | --- |
| Flow Direction | The direction of the TSC flow (uplink or downlink). |
| Periodicity | It refers to the time period between start of two bursts. |
| Burst Arrival time (Optional) | The latest possible time when the first packet of the data burst arrives at either the ingress of the RAN (downlink flow direction) or egress interface of the UE (uplink flow direction). |
| Survival Time (Optional) | It refers to the time period an application can survive without any burst, as defined in clause C.2.3 of TS 22.104 [105]. |

***Start Next Excerpt from 3GPP TS 23.501 V17.0.0***

5.27.3 Support for TSC QoS Flows

TSC QoS Flows use a Delay-critical GBR resource type and TSC Assistance Information. TSC QoS Flows may use standardized 5QIs, pre-configured 5QIs or dynamically assigned 5QI values (which requires signalling of Qos characteristics as part of the QoS profile) as specified in clause 5.7.2. For each instance of Periodicity, within each Period (defined by periodicity value), TSC QoS Flows are required to transmit only one burst of maximum size MDBV within the 5G-AN PDB. Known QoS Flow traffic characteristics provided in the TSCAI may be used to optimize scheduling in the 5GS.

The following is applicable for the QoS profile defined for TSC QoS Flows:

1. The TSC Burst Size may be used to set the MDBV as follows:

The maximum TSC Burst Size is considered as the largest amount of data within a time period that is equal to the value of 5G-AN PDB of the 5QI that was set for this traffic class. The maximum value of TSC Burst Size should be mapped to a 5QI with MDBV that is equal or higher. This 5QI also shall have a PDB value that satisfies the bridge delay capabilities (see clause 5.27.5 for more details) reported for the corresponding traffic class. For TSC QoS Flows, the Maximum Burst Size of the aggregated TSC streams to be allocated to this QoS Flow can be similarly mapped to a 5QI with MDBV value that is equal or higher, and the PDB of this 5QI shall also satisfy the bridge delay capabilities reported.

2. The PDB is explicitly divided into 5G-AN PDB and CN PDB as described in clause 5.7.3.4. Separate delay budgets are necessary for calculation of expected packet transmit times on 5G System interfaces. For the TSC QoS Flow, the 5G-AN PDB is set to value of 5QI PDB minus the CN PDB as described in clause 5.7.3.4.

The CN PDB may be static value or dynamic value and is up to the implementation of 5GS bridge.

3. The Maximum Flow Bitrate calculated by the TSN AF as per Annex I.1 may be used to set GBR. In this case, MBR is set equal to GBR.

4. ARP is set to a pre-configured value.

***End Excerpts from 3GPP TS 23.501 V17.0.0***

SUMMARY

Systems and methods are disclosed for data burst volume indication for Time Sensitive Communication (TSC). In one embodiment, a method performed by Radio Access Network (RAN) node comprises receiving, from a core network (CN) node, one or more parameters, in additional to a maximum data burst volume (MDBV) parameter, that describe one or more data volume characteristics of a Quality of Service (QoS) flow. In this manner, compared to always assuming the worst-case scenario with the MDBV, the RAN node has a more accurate understanding of the traffic characteristics, which allows the RAN node to optimally schedule radio resources to cater to the data volume.

In one embodiment, the method further comprises performing one or more operational tasks based on the one or more parameters. In one embodiment, the one or more operational tasks comprises scheduling or allocating resources for a data radio bearer associated to the QoS flow.

In one embodiment, the QoS flow is a guaranteed bit rate (GBR) QoS flow.

In one embodiment, the GBR QoS flow is of a delay-critical resource type. In one embodiment, the GBR QoS flow is of a non-delay-critical resource type.

In one embodiment, the QoS flow is a non-guaranteed bit rate QoS flow.

In one embodiment, receiving the one or more parameters comprise receiving the one or more parameters as Time-Sensitive Communication Assistance Information (TSCAI).

In one embodiment, receiving the one or more parameters comprise receiving the one or more parameters as one or more QoS parameters.

In one embodiment, receiving the one or more parameters comprise receiving at least one of the one or more parameters as TSCAI and receiving at least one other of the one or more parameters as at least one QoS parameter.

In one embodiment, the one or more parameters comprise a parameter that indicates a minimum data burst volume for the QoS flow. In one embodiment, one or more QoS requirements associated to the QoS flow are applied to the minimum data burst volume rather than the MDBV. In one embodiment, one or more QoS requirements associated to the QoS flow are applied to the MDBV.

In one embodiment, the one or more parameters comprise one or more parameters that indicate a data burst volume range of a next message on the QoS flow with respect to an actual size of a previous message on the QoS flow. In one embodiment, the one or more parameters that indicate the data burst volume range of the next message on the QoS flow with respect to the actual size of the previous message on the QoS flow are configured according to a confidence interval. In one embodiment, the confidence interval is tuned according to a packet error rate (PER) of the QoS flow.

In one embodiment, the one or more parameters comprise one or more parameters that indicate one or more statistical properties of the data burst volume of the QoS flow. In one embodiment, the one or more statistical properties of the data burst volume of the QoS flow comprise an average data burst volume of the QoS flow, a variance of the data burst volume of the QoS flow, or both the average data burst volume and the variance of the data burst volume of the QoS flow. In one embodiment, the one or more parameters that indicate the one or more statistical properties of the data burst volume of the QoS flow are provided as TSCAI.

In one embodiment, the one or more parameters comprise one or more parameters that indicate a distribution of the data burst volume of the QoS flow.

In one embodiment, the one or more parameters comprise one or more parameters that indicate a generalized conditional distribution of the data burst volume of the QoS flow with respect to a previous data burst volume of the QoS flow.

In one embodiment, the one or more parameters comprise one or more parameters that indicate a relative burst size in comparison to another burst data volume indication for the QoS flow. In one embodiment, the other burst data volume indication is by MDBV, or by the minimum data burst volume. In one embodiment, the other burst data volume indication is by observation, by the RAN node, of the actual burst data volume of all previous messages.

In one embodiment, the one or more parameters comprise one or more parameters that indicate a relative deviation from a minimum burst size indicated for the QoS flow.

In one embodiment, the one or more parameters comprise different parameters for different sub-flows of the QoS flow.

In one embodiment, the one or more parameters comprise one or more parameters related to aperiodic deterministic traffic for the QoS flow.

Corresponding embodiments of a RAN node are also disclosed. In one embodiment, a RAN node is adapted to receive, from a CN, one or more parameters, in additional to a MDBV parameter, that describe one or more data volume characteristics of a QoS flow.

In another embodiment, a RAN node comprises processing circuitry configured to cause the RAN node to receive, from a CN, one or more parameters, in additional to a MDBV parameter, that describe one or more data volume characteristics of a QoS flow.

Embodiments of a method performed by a CN node are also disclosed. In one embodiment, a method performed by a CN node comprises sending, to a RAN node, one or more parameters, in additional to a MDBV parameter, that describe one or more data volume characteristics of a QoS flow.

In one embodiment, the QoS flow is a GBR QoS flow. In one embodiment, the GBR QoS flow is of a delay-critical resource type. In one embodiment, the GBR QoS flow is of a non-delay-critical resource type.

In one embodiment, the QoS flow is a non-guaranteed bit rate QoS flow.

In one embodiment, receiving the one or more parameters comprise receiving the one or more parameters as TSCAI.

In one embodiment, receiving the one or more parameters comprise receiving the one or more parameters as one or more QoS parameters.

In one embodiment, receiving the one or more parameters comprise receiving at least one of the one or more parameters as TSCAI and receiving at least one other of the one or more parameters as at least one QoS parameter.

In one embodiment, the one or more parameters comprise a parameter that indicates a minimum data burst volume for the QoS flow. In one embodiment, one or more QoS requirements associated to the QoS flow are applied to the minimum data burst volume rather than the MDBV. In one embodiment, one or more QoS requirements associated to the QoS flow are applied to the MDBV.

In one embodiment, the one or more parameters comprise one or more parameters that indicate a data burst volume range of a next message on the QoS flow with respect to an actual size of a previous message on the QoS flow. In one embodiment, the one or more parameters that indicate the data burst volume range of the next message on the QoS flow with respect to the actual size of the previous message on the QoS flow are configured according to a confidence interval. In one embodiment, the confidence interval is tuned according to a packet error rate, PER, of the QoS flow.

In one embodiment, the one or more parameters comprise one or more parameters that indicate one or more statistical properties of the data burst volume of the QoS flow. In one embodiment, the one or more statistical properties of the data burst volume of the QoS flow comprise an average data burst volume of the QoS flow, a variance of the data burst volume of the QoS flow, or both the average data burst volume and the variance of the data burst volume of the QoS flow. In one embodiment, the one or more parameters that indicate the one or more statistical properties of the data burst volume of the QoS flow are provided as TSCAI.

In one embodiment, the one or more parameters comprise one or more parameters that indicate a distribution of the data burst volume of the QoS flow.

In one embodiment, the one or more parameters comprise one or more parameters that indicate a generalized conditional distribution of the data burst volume of the QoS flow with respect to a previous data burst volume of the QoS flow.

In one embodiment, the one or more parameters comprise one or more parameters that indicate a relative burst size in comparison to another burst data volume indication for the QoS flow. In one embodiment, the other burst data volume indication is by MDBV, or by the minimum data burst volume. In one embodiment, the other burst data volume indication is by observation, by the RAN node, of the actual burst data volume of all previous messages.

In one embodiment, the one or more parameters comprise one or more parameters that indicate a relative deviation from a minimum burst size indicated for the QoS flow.

In one embodiment, the one or more parameters comprise different parameter for different sub-flows of the QoS flow.

In one embodiment, the one or more parameters comprise one or more parameters related to aperiodic deterministic traffic for the QoS flow.

Corresponding embodiments of a CN node are also disclosed. In one embodiment, a CN node is adapted to send, to a RAN node, one or more parameters, in additional to a MDBV parameter, that describe one or more data volume characteristics of a QoS flow.

In another embodiment, a CN node comprises processing circuitry configured to cause the CN node to send, to a RAN node, one or more parameters, in additional to a MDBV parameter, that describe one or more data volume characteristics of a QoS flow.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
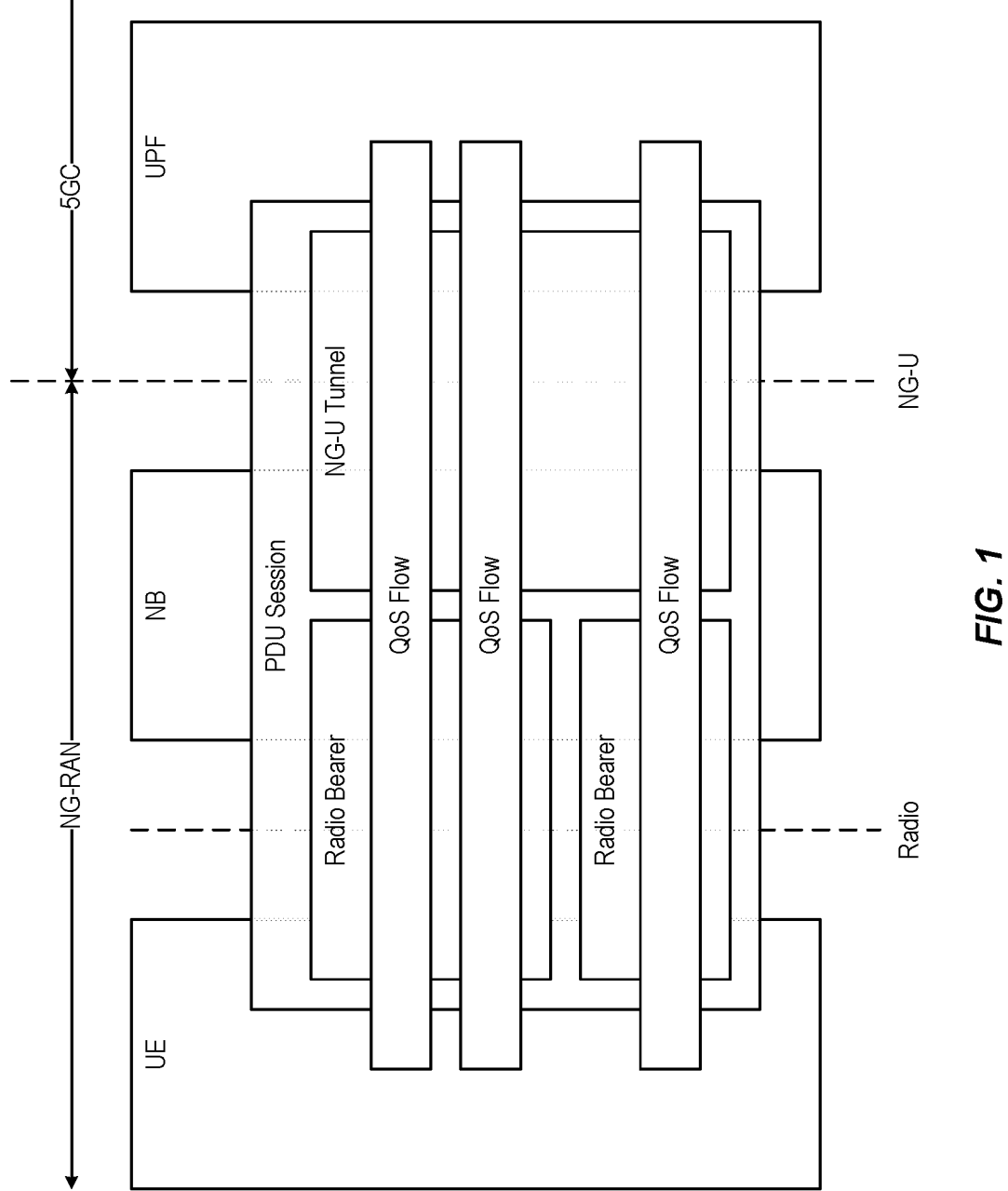
FIG. 1 is a reproduction of FIG. 12-1 from Third Generation Partnership Project (3GPP) Technical Specification (TS) 38.300 V16.5.0.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). For the delay critical Guaranteed Bit Rate (GBR) resource type, only the maximum data burst volume (MDBV) is indicated for a Quality of Service (QoS) flow. The actual data burst volume is smaller than the value indicated by MDBV, and theoretically, the actual data burst volume can be zero. With the knowledge of only the MDBV value, the Next Generation Radio Access Network (NG-RAN) typically has to over-dimension radio resources so that, in the case the actual data volume is equal to the MDBV, the "reserved" radio resources would be sufficient to meet other QoS requirements (e.g., packet error rate (PER) and packet delay budget (PDB) for this QoS flow). This mechanism works well in the case that the burst size is small. For example, in the table 5.2-1 of 3GPP TS 22.104 (Service requirements for cyber-physical control applications in vertical domains), most use cases have a message size smaller than 1K byte.

Delay critical GBR QoS flows with a higher data rate (i.e., a large message size), however, are supposed to be support by the 5G system. Examples include Augmented Reality (AR)/Virtual Reality (VR)/extended Reality (XR), wired-2-wireless link replacement in 3GPP TS 22.104, and mobile robots' video-operated remote control in 3GPP TS 22.104. In such cases, for the gNB to over-dimension resources for the worst-case scenario (i.e., the maximum data burst volume) would negatively impact the system capacity and fewer UEs could be supported in the system.

Certain aspects of the present disclosure and their embodiments may provide solutions to the aforementioned or other challenges. Systems and methods are disclosed herein in which one or multiple parameters are introduced to describe more accurately the data volume characteristic in addition to the MDBV. In one embodiment, the one or more parameters introduced include any one or more of the following example parameters:

Minimum data burst volume

A range of data volume difference of the next message arrival compared to the previous one A distribution of data burst volume that generalizes the above two bullet points A finer granularity description of a set of sub-QoS flows within one QoS flow, in which each sub-QoS flow can be described by existing and newly proposed QoS/ Time Sensitive Communication (TSC) Assistance Information (TSCAI) related parameters.

An extension of the TSCAI to a-periodic deterministic traffic.

In one embodiment, the parameter(s) can be part of the TSCAI or part of the QoS parameters. In another embodiment, the parameters include one or more first parameters that are part of the TSCAI and one or more second parameters that are part of the QoS parameters.

Certain embodiments may provide one or more of the following technical advantage(s). Compared to always assuming the worst-case scenario with the MDBV, the NG-RAN has a more accurate understanding of the traffic characteristics. This allows the NG-RAN (e.g., a NG-RAN node such as, e.g., a gNB or gNB Distributed Unit (gNB-DU)) to dynamically/opportunistically/optimally schedule radio resources to cater to the (e.g., exact) data volume of each message arrival, e.g., allocate less radio resources if the actual data volume is low.

Figure 2:
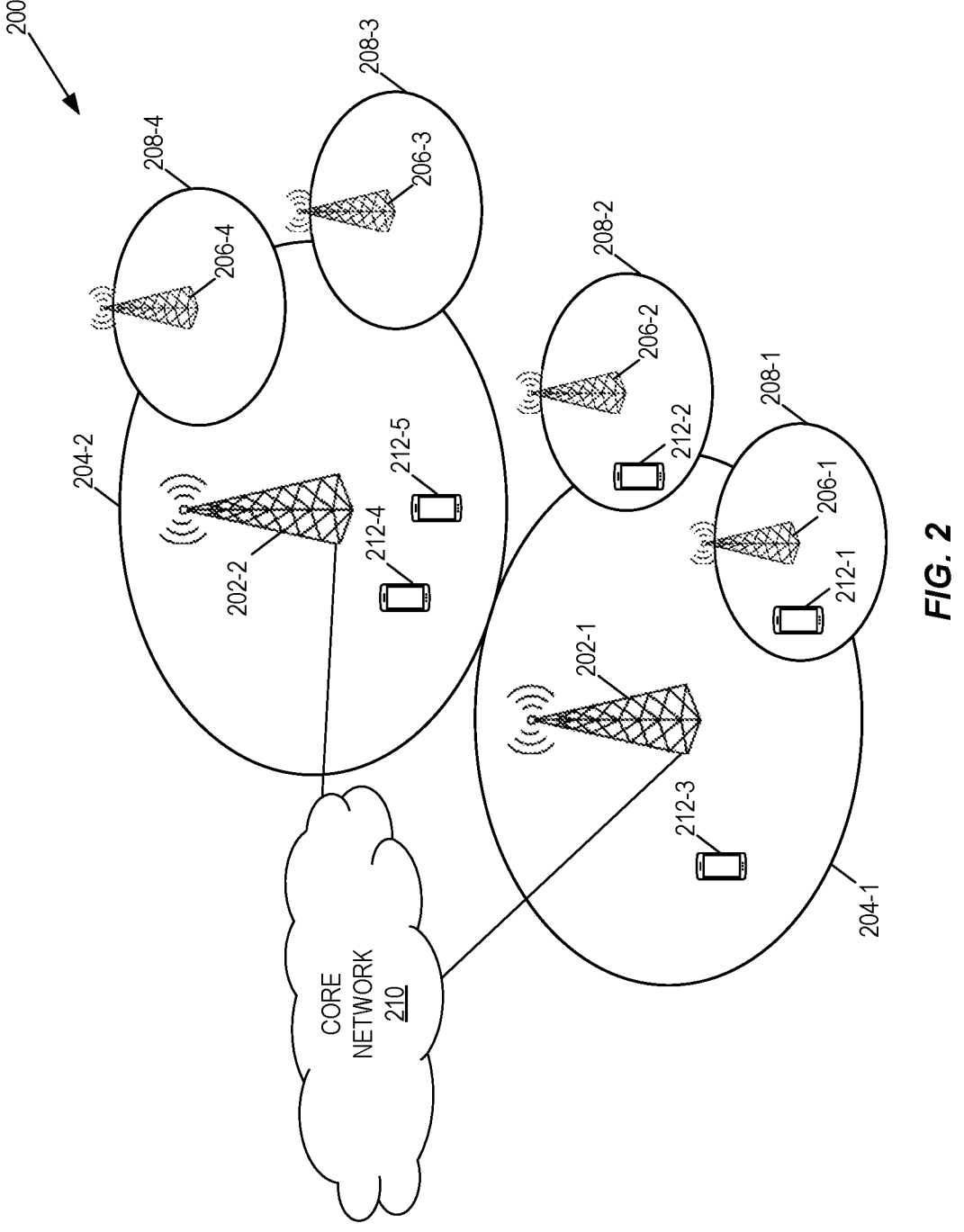
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC). In this example, the RAN includes base stations 202-1 and 202-2, which in the 5GS include next generation Node Bs (gNBs) (also referred to herein as NR base stations) and optionally next generation eNBs (ng-eNBs) (e.g., LTE RAN nodes connected to the 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or RRHs, or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5G System (5GS) is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs and as such sometimes referred to herein as UEs 212, but the present disclosure is not limited thereto.

Figure 3:
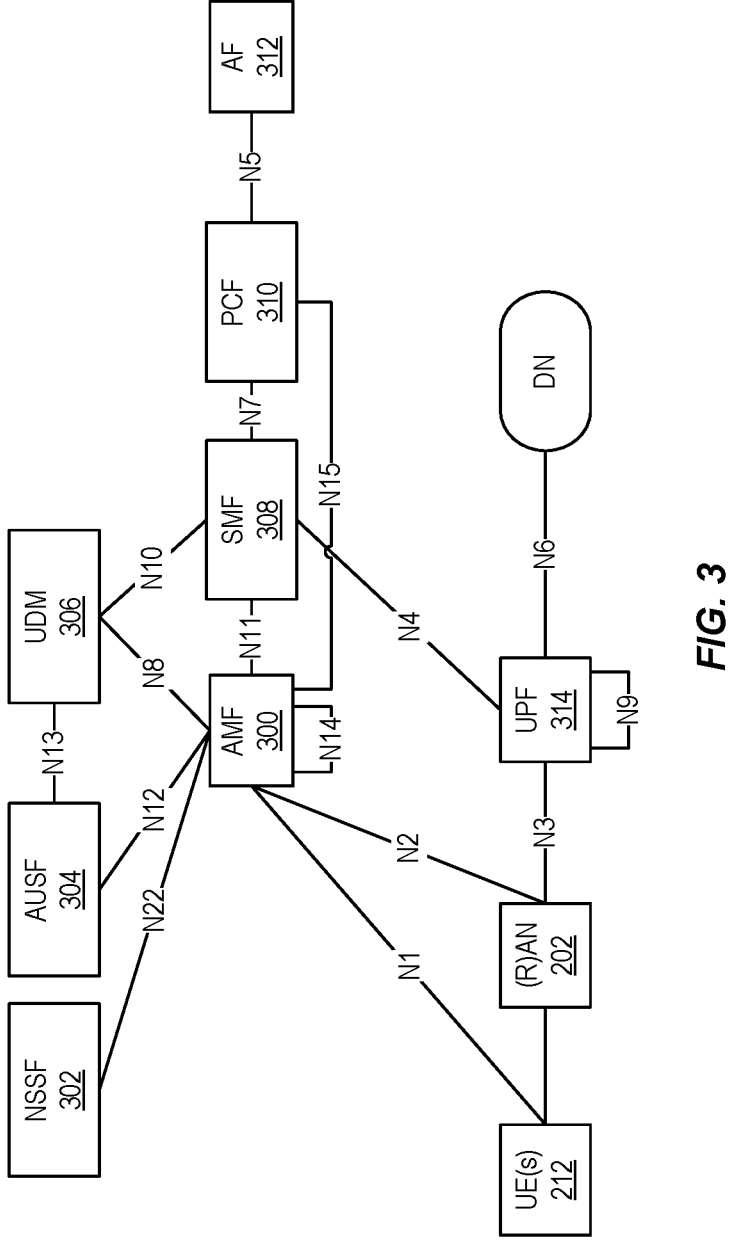
FIGS. 3 and 4 illustrate a wireless communication system represented as a Fifth Generation (5G) network architecture.

FIG. 3 illustrates a wireless communication system represented as a 5G network architecture composed of core Network Functions (NFs), where interaction between any two NFs is represented by a point-to-point reference point/ interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an AMF 300. Typically, the R(AN) 202 comprises base stations, e.g. such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating UP and CP. The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 4:
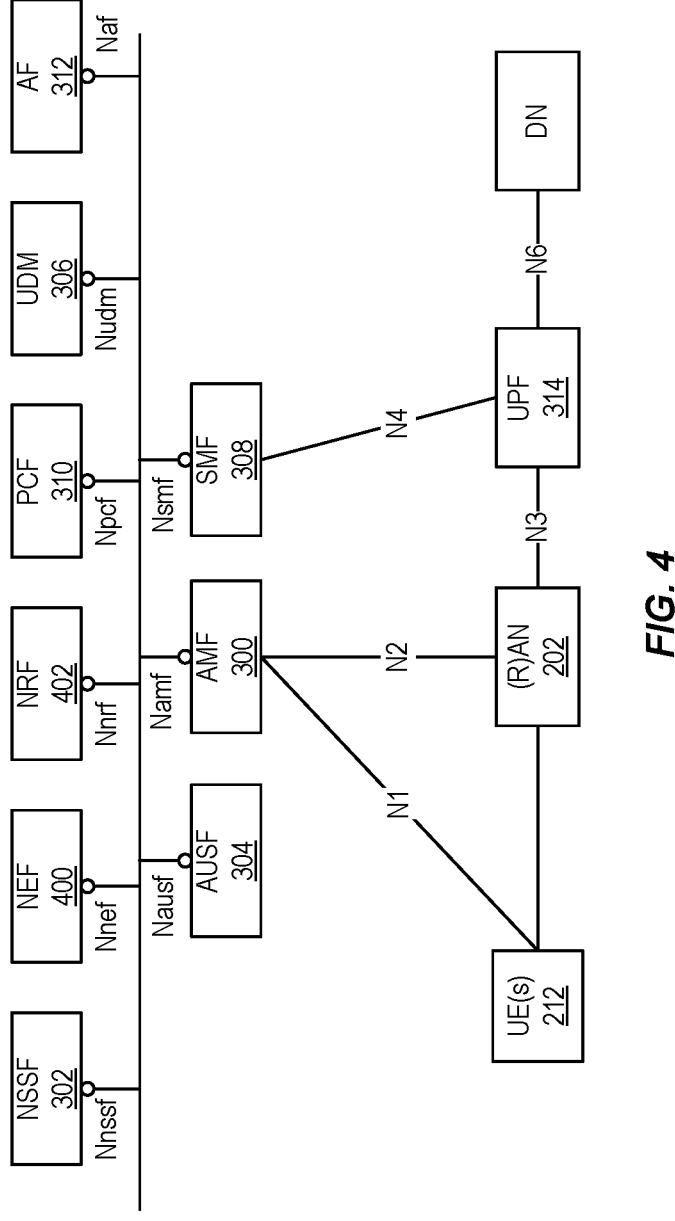

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFS through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400 and the NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support QoS. Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

In the following description, the base station 202 is referred to as a gNB (and thus sometimes denoted as gNB 202) as an example. However, it is to be understood that the description also intends to cover other types of base stations (e.g., ng-eNB), and thus NG-RAN and NG-RAN nodes in general.

In the main embodiment, a new parameter(s) is used to describe more accurately the data volume characteristic in addition to the MDBV indicated for a QoS flow. In one embodiment, the new parameter(s) is added as an additional/optional TSCAI. In another embodiment, the new parameter (s) is added as a new QoS parameter. In yet another embodiment, the new parameter(s) may include a first parameter(s) added as additional or optional TSCAI and a second parameter(s) added as a new QoS parameter. Moreover, in one embodiment, the new parameter(s) is used to indicate the amount of data within a period of 5G-AN Packet Delay Budget (PDB).

In a first follow-up embodiment, the new parameter(s) is used to indicate a minimum data burst volume. This is used to target use cases in which there is a minimum size of each message, but the size of each message varies randomly within the range between minimum and maximum. For example, In the case of XR, the minimum size could correspond to the information that will not be subject to a compression scheme, e.g., for video encoding, an I-frame (Intra-coded picture) which is a complete image like a JPG image. For other frames like P-frame and B-frame, the compression efficiency varies and are unpredictable. The resulting message sizes are captured by a range described by the two parameters of minimum data burst volume and maximum data burst volume.

In the case of mobile robots' video-operated remote control, the same principle of XR can be used here. Additionally, the minimum data burst volume could correspond to a minimum video/audio quality requirement for this use case.

In the case of wired-2-wirelss link replacement, the minimum data volume could correspond to a minimum guaranteed bit rate for the wired link replacement. For example, 5G system could guarantee 10 Mbits/s all the time, but for a higher data rate of 100 Mbits/s or 1 Gbits/s, there is a slow start phase for 5G system to adapt the traffic inflow.

In the case that this minimum data burst volume is provided, there are different alternative ways to interpret this parameter within the QoS framework:

Alternative 1: In this alternative, associated QoS requirements (i.e., PDB and PER) for a flow are applied to the minimum data burst volume instead of the maximum data burst volume within 5G-AN PDB. In other words, 5G system is only required to provide the QoS requirement to the minimum data burst volume. This can be useful for the above wired-2-wireless link replacement use case where 5G can support a guaranteed bit rate.

Alternative 2: In this alternative, associated QoS requirements (i.e., PDB and PER) for a flow are still applied for the maximum data burst volume within 5G-AN PDB. The minimum data burst volume is optional for the gNB and used for the gNB to opportunistically exploit the traffic pattern knowledge to optimize radio resource allocation. This can be useful for the XR in which the maximum data burst volume would typically be very large and the variation between the minimum and the maximum is also large, but there is a strict requirement to meet the QoS requirement for the maximum data burst volume.

In a non-limiting example on how this parameter is useful for the gNB scheduler, the gNB can reserve resources for a UE according to the minimum data burst volume (e.g., using configured grants). To serve a data burst that exceeds the minimum data burst volume, the gNB can schedule the resources in a dynamic or hybrid fashion. For example, if the gNB observes that more data volume is expected (the mechanism is out of the scope of the present disclosure), then the gNB can transmit dynamic grants to serve those traffics in addition to the resources provided in a static matter (e.g., using configured grants) to serve the minimum data burst volume.

In a second follow-up embodiment, the new parameter(s) is used to indicate the data burst volume range of the next message with respect to the actual size of the previous message. For example, this parameter can consist of two values of $-x1$ bytes and $x2$ bytes and this means that the size of the next message is between $[\max(-x1+y, 0), \min(x2+y, MDBV)]$ bytes in which $y$ is the actual size of the previous message. If the minimum data burst volume is also indicated, then the range can be $[\max(-x1+y, \text{min data burst volume}), \min(x2+y, MDBV)]$ bytes.

In one embodiment, the parameter, e.g., $-x1$ and $x2$, are configured according to a confidence interval, for example, the actual message size of the next message falls within the indicated range with a 99.99% confidence where the confidence interval is further tuned according to the PER of the QoS flow. For example, if the PER is 99.99%, a rule of thumb could be that the confidence interval is ten times more of that (99.999%) so that it is of little impact on the PER performance.

This parameter can be useful for the use case where there is a strong correlation of sizes between consecutive messages. For example, in the XR and video-operated remote control use case, it is not expected that the image would dramatically change between two message (for example, with an interval of 20 milliseconds) and thus the encoding of these images would lead to a similar message size.

When this parameter is provided, it can be part of the TSCAI and there is no additional associated QoS requirement with this parameter. With this information, the gNB can proactively allocate radio resources for the next message based on the observation of the size of the message of the previous messages.

Figure 6:
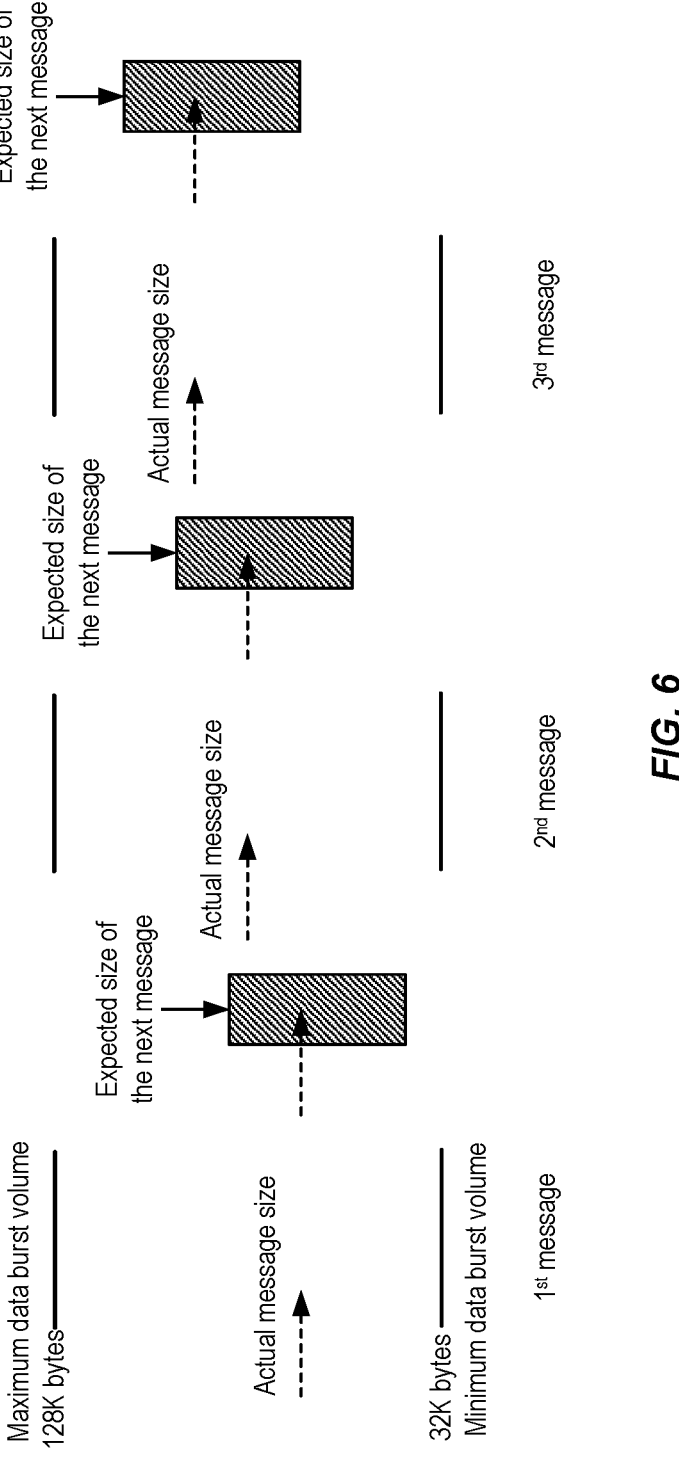
FIG. 6 illustrates one example of an embodiment in which a new parameter(s) is used to indicate a data burst volume range of the next message with respect to the actual size of the previous message.

FIG. 6 illustrates one example of the second follow-up embodiment.

In a third follow-up embodiment, TSCAI can include statistical properties of the data burst volume. For example, the statistical properties of the data burst volume may include the average and/or the variance of the data burst volume. More specifically, the new parameter(s) may include either or both of the following examples:

TSCAI can include average data burst volume (ADBV) in 5QI values. This is useful in scenarios like XR where we have variable data from certain minima to maxima. Allocating, e.g., periodic resources based on MDBV might lead to wastage of resources. However, using ADBV, the periodic allocations can be tuned to such values and during certain period, if there would be a need to serve burst size bigger than ADBV, then those cases can be supplemented with additional dynamic grant to assist periodic grant.

TSCIAI can include variance of the traffic in 5QI values. Traffics which are identified with certain variance are mapped to certain QoS flows (resources) that are identified with 5QI value indicating the related variance. This is useful as network would be ready (pro-active) to allocate faster additional dynamic grants because it knows the QoS flow associated with traffic variance and data received on this flow (resources) may need additional or supplement resources on timely basis.

In a fourth follow-up embodiment, the new parameter(s) includes a parameter that indicates the distribution of data burst volume. This embodiment generalizes the above three embodiments. When this parameter is provided, it can, for example, be part of the TSCAI, and there is no additional associated QoS requirement with this parameter.

For example, the distribution could be given as a list of sizes and an associated list of probabilities. In another example, the data burst volume distribution could be given as one or more of the following:

indicator for distribution, e.g. exponential, gamma, Poisson, truncated normal, . . .

indicators for statistical properties, e.g. mean, variance, skewness (i.e., relation between third and second moment), n-th moment (where mean, variance are sub-cases, i.e., 0-th moment, $1^{st}$-moment, respectively, and so on)

indicators for distribution specific parameters, e.g.
 rate parameter $\lambda$ for exponential distribution, or
 shape $\alpha$ and rate $\beta$ parameters for gamma distribution, or
 mean, variance, min, and max for truncated normal distribution, or . . .

Inter-arrival times related parameters can be attributed as well (e.g., modeled by distribution such as exponential distribution); this is because extremely small inter-arrival time between bursts is equivalent to a burst of large duration. The reason is that traffic like XR has noticeable variance and has given bounded latency (where average periodicity defined), and this does not mean that the arrivals between 2 bursts are fixed, rather they can be depicted using some distribution (as it is indicated above using distribution to model any characteristics), e.g., intensity of rate parameter of exponential distribution can help to model a periodic stream. Therefore, TSCAI can include inter-arrival rate parameters to model streams periodic streams accurately indicators related to range, or interquartile range or range for specific X % of mid spread In a fifth follow-up embodiment, the new parameter(s) include a parameter(s) that indicate a generalized conditional distribution of data burst volume with respect to a previous data burst volume. When this parameter is provided, it can, for example, be part of the TSCAI and there is no additional associated Qos requirement with this parameter.

In some examples, the new parameter(s) include a parameter(s) that indicate a conditional distribution of data burst value where conditioning is with respect to a previous data burst volume. For example, for a list of sizes, an associated matrix of probabilities could be given where the i-th row (or column) corresponds the list of associated probabilities conditioned that previous size was equal to the i-th size. Suppose the list of sizes are [50, 100, 200] (e.g., bytes or kilobytes) and the associated matrix is [[0 0.5 0.5]; [0.25 0 0.75]; [0.25 0.75 0]], then if previous size was 200 the associate probabilities for the sizes [50, 100, 200] is [0.25 0.75 0]. Hence, in this example, the next size will never be 200 again and size 100 is more likely than 50.

In other examples, a relative burst size is indicated as new parameter in comparison to the existing maximum burst size indication. In this case the parameter is a percentage of this maximum burst size, i.e. the maximum relative deviation expected. In yet another example, the maximum burst size is derived by RAN itself based on observations, and only the relative burst size deviation from this maximum is indicated to RAN. In another variant, relative deviation from minimum burst size may be indicated, where also the minimum burst size is not necessarily indicated but based on RAN observations. Relative burst size indications may be easier to derive in the CN, as they refer, e.g., for video traffic to known compression rates (between uncompressed/I-frame compressed/P-frame compressed) images.

In a sixth follow-up embodiment, TSCAI is extended for packets of multiple streams. The existing TSCAI is defined for periodic deterministic communication. Furthermore, it assumes that, during a single period, single burst is expected. This restriction may be too limiting for certain services, for example, if the QoS flow is composed of aggregated TSN streams, where different streams may have different periodicity, and/or maximum burst size, and/or maximum data rate, and/or minimum data rate, and/or Burst Arrival time, and/or survival time.

Thus, there is a need to extend the TSCAI to include multiple sets of the assistance information. For instance, one set is provided for one TSN stream. As an example, the TSCAI can be extended as follows:

TABLE 1

| TSC Assistance Information Extended (TSCAI-Extended) | |
|---|---|
| Assistance Information | Description |
| Flow Direction | The direction of the TSC flow (uplink or downlink). |
| N | Number of streams that use different periodicity and/or burst arrival time and/or survival time. |
| {Periodicity 0, Periodicity 1, . . . Periodicity (N − 1)} | Periodicity refers to the time period between start of two bursts. Periodicity j is the periodicity for stream j. |
| {Burst Arrival time 0, Burst Arrival time 1, . . . , Burst Arrival time (N − 1)} | Burst Arrival time is the latest possible time when the first packet of the data burst arrives at either the ingress of the RAN (downlink flow direction) or egress interface of the UE (uplink flow direction). Burst Arrival time j is the value for stream j. Burst Arrival time may be an optional parameter. |
| {Survival Time 0, Survival Time 1, . . . , Survival Time (N − 1)} | Survival Time refers to the time period an application can survive without any burst, as defined in clause C.2.3 of TS 22.104 [105]. Survival Time j is the value for stream j. Survival Time may be an optional parameter. |

Other than the Assistance Information types shown in Table 1, other types of assistance information can be included for each stream as well. For example, maximum burst size, maximum data rate, minimum data rate, and the new parameters introduced herein.

This can be useful in the case where a video stream is mapped to one QoS flow and due to video encoding, the traffic rate varies between each message. The finer granularity sub-QoS flow information can be adjusted according to the characteristics of the video encoding. In a non-limiting example, the I frame in a video streaming can have a longer periodicity and a more stringent reliability requirement on message delivery and perhaps a survival time of zero. On the other hand, the P and B frame in a video streaming can have a shorter periodicity and a less stringent reliability requirement.

In a seventh follow-up embodiment, TSCAI is extended for aperiodic deterministic traffic. Currently, TSCAI provides information on the TSC traffic pattern for 5G-AN to allow it to more efficiently schedule periodic, deterministic traffic flows. However, there are numerous services that require aperiodic deterministic communication, which is without a pre-set sending time, but still with stringent requirements on timeliness and availability of the communication service. Such services include: Mobile robots-video streaming; Smart grid millisecond level precise load control; Augmented reality; bi-directional transmission to image processing server; Wired-2-wireless 100 Mbit/s link replacement; etc. Typical activity patterns for which this kind of communication is suitable are event-driven actions.

Exemplary assistance information types are shown in Table 2 for aperiodic deterministic communication. One or more of the explementary assistance information types can be included as TSCAI-Aperiodic. SMF derives TSCAI-Aperiodic on a per QoS Flow basis and sends it to NG-RAN.

TABLE 2

| TSC Assistance Information for aperiodic deterministic communication (TSCAI-Aperiodic) | |
|---|---|
| Assistance Information | Description |
| Flow Direction | The direction of the TSC flow (uplink or downlink). |
| Service bit rate (bits/sec) | The average data rate (bits/sec) that 5G-AN provides on average during a given, moving, time window |
| User experienced data rate (bits/sec) | The minimum data rate required to achieve an experience of sufficient quality. This parameter may be optional. |
| Time window (sec) | The moving (or sliding) time window used in calculating Service bit rate and User experienced data rate. This parameter may be optional. |
| Survival Time | It refers to the time period an application can survive without any burst, as defined in clause C.2.3 of TS 22.104 [105]. This parameter may be optional. |

For aperiodic deterministic communication, the user experienced data rate gives the lower threshold for the data rate that's expected of 5G-AN in any of the time windows.

Figure 5:
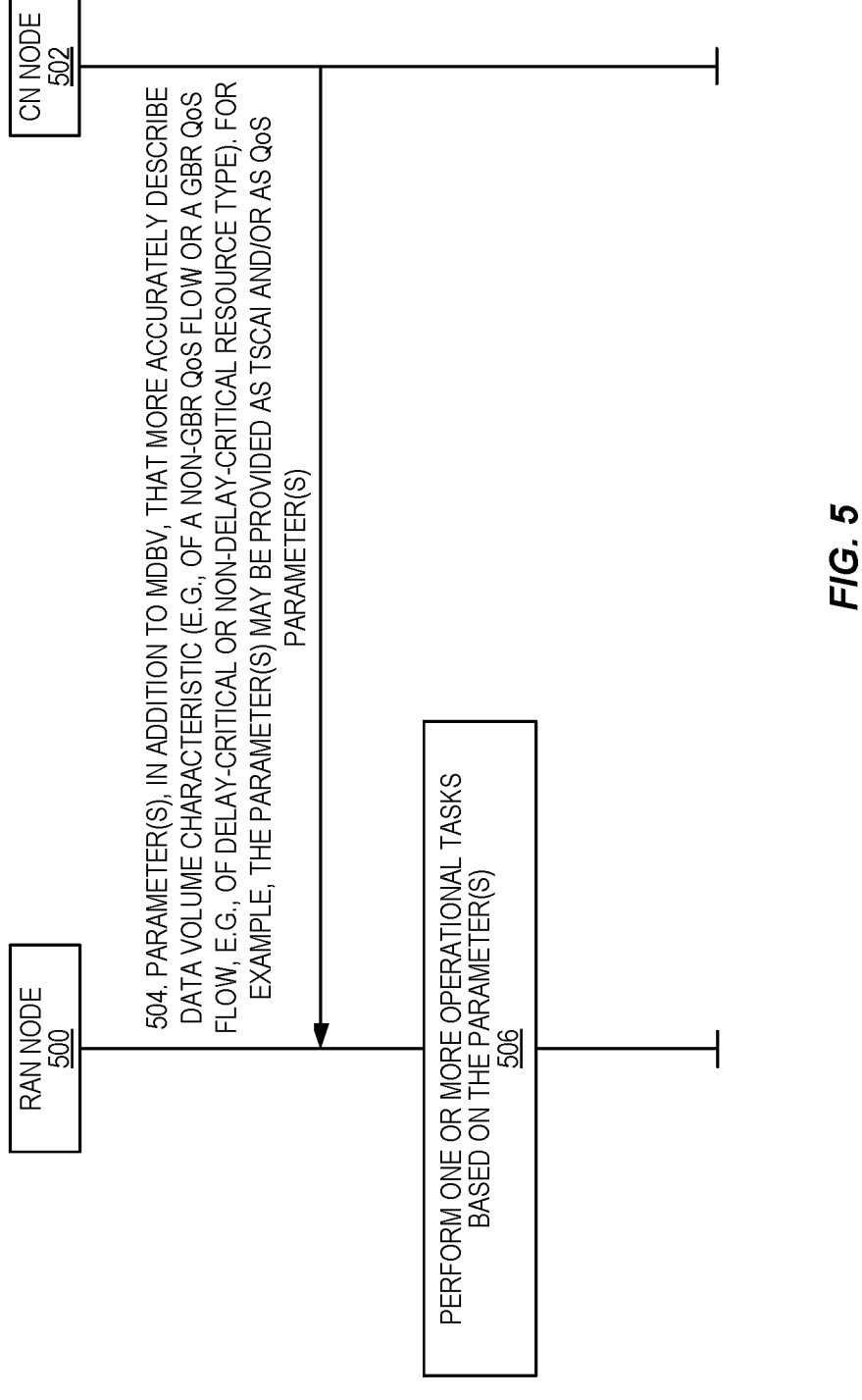
FIG. 5 illustrates the operation of a Radio Access Network (RAN) node and a Core Network (CN) node in accordance with at least some of the embodiments described herein.

FIG. 5 illustrates the operation of a RAN node 500 and a core network (CN) node 502 in accordance with at least some of the embodiments described above. The RAN node 500 may be, e.g., a base station 202 such as, e.g., a gNB or a network node that implements part of the functionality of a base station 202 (e.g., a gNB-DU). The CN node 502 may be any core network node that communicates directly or indirectly with the RAN node 500. As illustrated, the CN node 502 sends, to the RAN node 500, one or more parameters, in addition to MDBV, that more accurately describe a data volume characteristic(s) of, e.g., a non-GBR QoS flow or a GBR QoS flow using the non-delay critical GBR resource type or the delay-critical GBR resource type (step 504). The one or more parameters may be provided as TSCAI, provided as one or more QoS parameters, or both. The one or more parameters may include any one or more of the parameters described above with respect to the main embodiment and the first, second, third, fourth, fifth, sixth, or seventh follow-up embodiments. For example, in one embodiment, the one or more parameters are provided via TSCAI, and the CN node 502 is an SMF (although some other NFs such as, e.g., NEF/TSN AF may send such parameters to the SMF, e.g., via a PCF). As another example, in one embodiment, the one or more parameters are provided as QoS parameter(s), and the CN node 502 is an SMF. The RAN node 500 performs one or more operational tasks (e.g., scheduling or allocating resources for a data radio bearer (DRB) associated to a PDU session that comprises the QoS flow) based on the received one or more parameters (step 506). For example, the RAN node 500 (e.g., gNB) may schedule or allocate static resources (e.g., configured grants), according to a data burst volume from the received parameter(s) (which may be, e.g., TSCAI and/or QoS parameters) (e.g., from minimum data burst volume, a data burst volume corresponding to the 99% percentile, or average data burst volume). The RAN node 500 (e.g., gNB) may schedule/allocate the resources in a dynamic or hybrid fashion to serve the instantaneous data burst volume for each traffic arrival. For example, if the RAN node 500 (e.g., gNB) observes that more data volume is expected, then the RAN node 500 can transmit dynamic grants to serve those traffics in addition to the resources provided in a static matter (e.g., using configured grants) to serve the minimum data burst volume.

Figure 7:
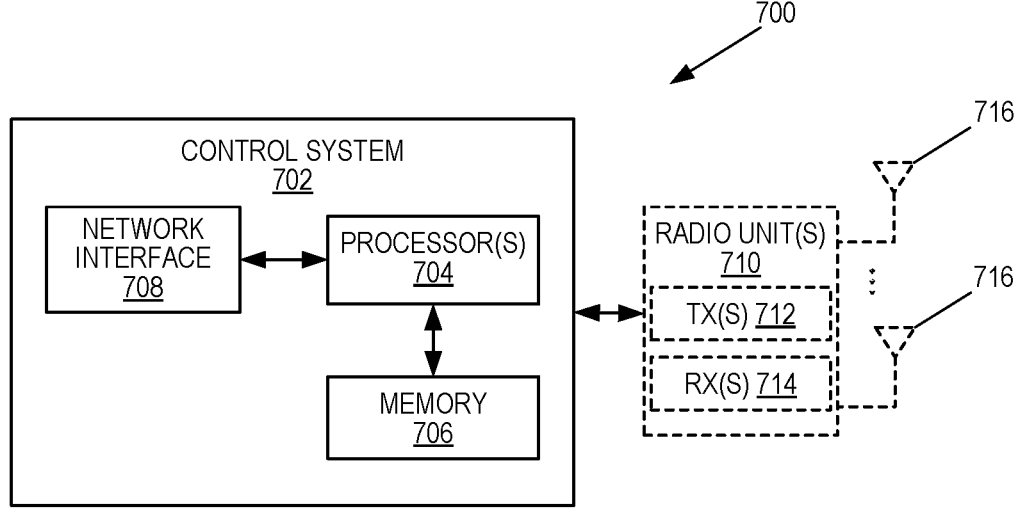
FIGS. 7, 8, and 9 are schematic block diagrams of example embodiments of a network node.

FIG. 7 is a schematic block diagram of a network node 700 according to some embodiments of the present disclosure. Optional features are represented by dashed boxes. The network node 700 may be, for example, the network node 500 (e.g., a base station 202 or a network node that implements all or part of the functionality of the base station 202 or gNB described herein) or the CN node 502 (e.g., a network node that implements a NF in the 5GC). As illustrated, the network node 700 includes a control system 702 that includes one or more processors 704 (e.g., Central Processing Units (CPUs), Application Specific Integrated Circuits (ASICs), Field Programmable Gate Arrays (FP-GAs), and/or the like), memory 706, and a network interface 708. The one or more processors 704 are also referred to herein as processing circuitry. In addition, if the network node 700 is a RAN node (e.g., the RAN node 500), the network node 700 may include one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of the network node 700 as described herein (e.g., one or more functions of the RAN node 500, base station 202, or gNB described herein or one or more functions of the CN node 502 described herein). In some embodiments, the function(s) are implemented in software that is stored, e.g., in the memory 706 and executed by the one or more processors 704.

Figure 8:
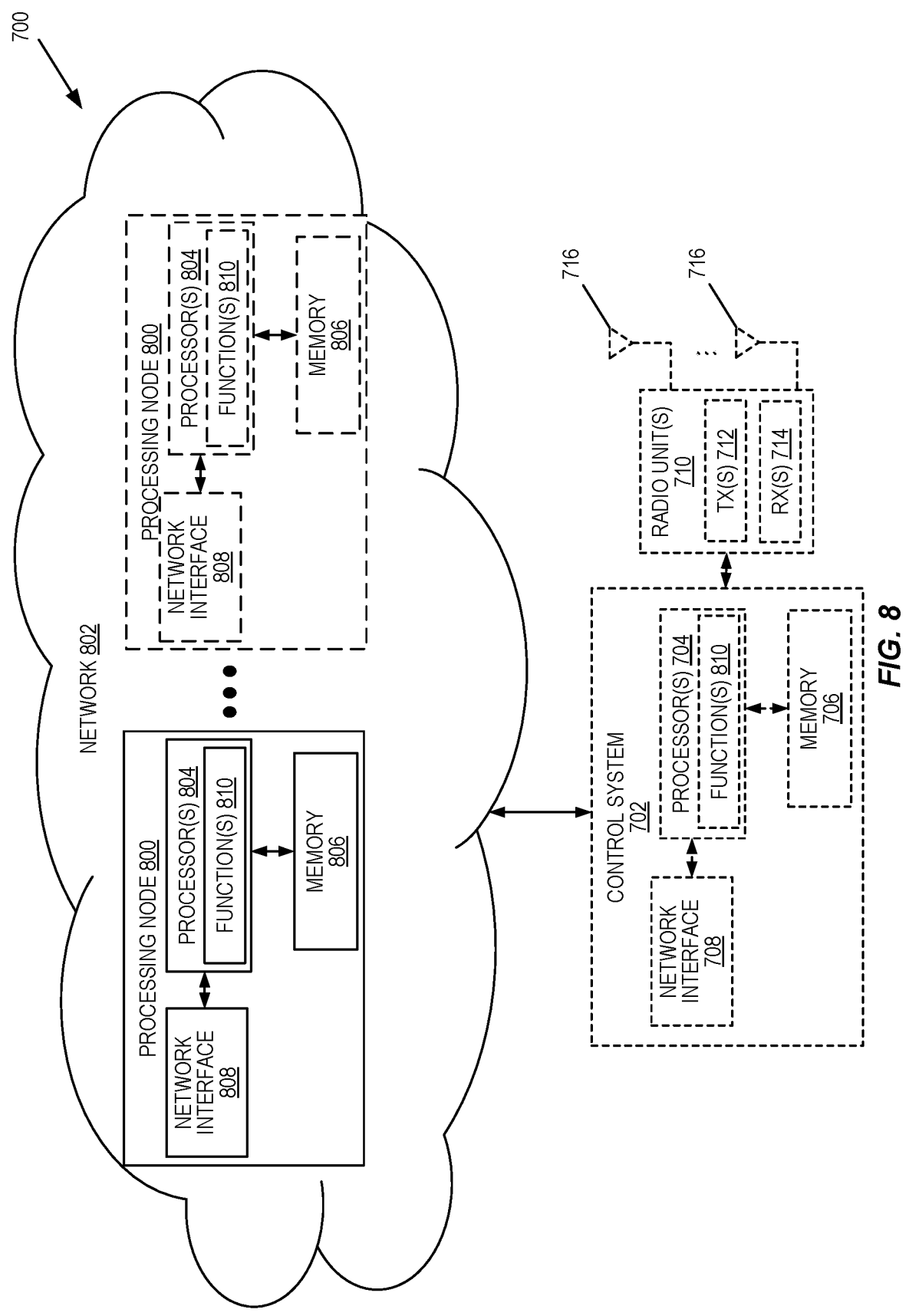

FIG. 8 is a schematic block diagram that illustrates a virtualized embodiment of the network node 700 according to some embodiments of the present disclosure. Again, optional features are represented by dashed boxes. As used herein, a "virtualized" network node is an implementation of the network node 700 in which at least a portion of the functionality of the network node 700 is implemented as a virtual component(s) (e.g., via a virtual machine(s) executing on a physical processing node(s) in a network(s)). As illustrated, if the network node 700 is a RAN node, the network node 700 may include the control system 702 and/or the one or more radio units 710, as described above. The control system 702 may be connected to the radio unit(s) 710 via, for example, an optical cable or the like. The network node 700 includes one or more processing nodes 800 coupled to or included as part of a network(s) 802. If present, the control system 702 or the radio unit(s) are connected to the processing node(s) 800 via the network 802. Each processing node 800 includes one or more processors 804 (e.g., CPUs, ASICS, FPGAS, and/or the like), memory 806, and a network interface 808.

In this example, functions 810 of the network node 700 described herein (e.g., one or more functions of the RAN node 500, base station 202, or gNB described herein or one or more functions of the CN node 502 described herein) are implemented at the one or more processing nodes 800 or distributed across the one or more processing nodes 800 and the control system 702 and/or the radio unit(s) 710 in any desired manner. In some particular embodiments, some or all of the functions 810 of the network node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of the network node 700 or a node (e.g., a processing node 800) implementing one or more of the functions 810 of the network node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
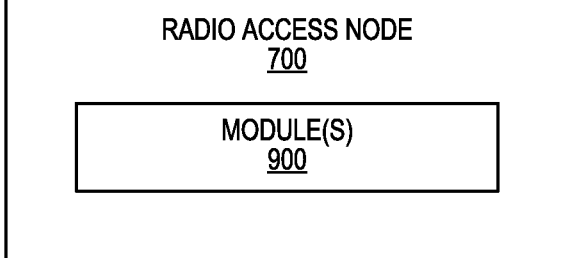

FIG. 9 is a schematic block diagram of the network node 700 according to some other embodiments of the present disclosure. The network node 700 includes one or more modules 900, each of which is implemented in software. The module(s) 900 provide the functionality of the network node 700 described herein (e.g., one or more functions of the RAN node 500, base station 202, or gNB described herein or one or more functions of the CN node 502 described herein). This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by Radio Access Network, RAN, node (500), the method comprising receiving (504), from a core network, CN, node (502), one or more parameters, in additional to a maximum data burst volume, MDBV, parameter, that describe one or more data volume characteristics of a Quality of Service, QoS, flow.

Embodiment 2: The method of embodiment 1 further comprising performing (504) one or more operational tasks based on the one or more parameters.

Embodiment 3: The method of embodiment 2 wherein the one or more operational tasks comprises scheduling or allocating resources for a data radio bearer associated to a Protocol Data Unit, PDU, session that comprises the QoS flow.

Embodiment 4: The method of any of embodiments 1 to 3 wherein the QoS flow is a guaranteed bit rate, GBR, QoS flow.

Embodiment 5: The method of embodiment 4 wherein the GBR QoS flow is of a delay-critical resource type.

Embodiment 6: The method of embodiment 4 wherein the GBR QoS flow is of a non-delay-critical resource type.

Embodiment 7: The method of any of embodiments 1 to 3 wherein the QoS flow is a non-guaranteed bit rate QoS flow.

Embodiment 8: The method of any of embodiments 1 to 7 wherein receiving
(504) the one or more parameters comprise receiving (504) the one or more parameters as Time-Sensitive Communication Assistance Information, TSCAI.

Embodiment 9: The method of any of embodiments 1 to 7 wherein receiving (504) the one or more parameters comprise receiving (504) the one or more parameters as one or more QoS parameters.

Embodiment 10: The method of any of embodiments 1 to 7 wherein receiving (504) the one or more parameters comprise receiving (504) at least one of the one or more parameters as Time-Sensitive Communication Assistance Information, TSCAI, and receiving (504) at least one other of the one or more parameters as at least one QoS parameter.

Embodiment 11: The method of any of embodiments 1 to 10 wherein the one or more parameters comprise a parameter that indicates a minimum data burst volume for the QoS flow.

Embodiment 12: The method of embodiment 11 wherein one or more QoS requirements associated to the QoS flow are applied to the minimum data burst volume rather than the MDBV.

Embodiment 13: The method of embodiment 11 wherein one or more QoS requirements associated to the QoS flow are applied to the MDBV.

Embodiment 14: The method of any of embodiments 1 to 13 wherein the one or more parameters comprise one or more parameters that indicate a data burst volume range of a next message on the QoS flow with respect to an actual size of a previous message on the QoS flow.

Embodiment 15: The method of embodiment 14 wherein the one or more parameters that indicate the data burst volume range of the next message on the QoS flow with respect to the actual size of the previous message on the QoS flow are configured according to a confidence interval.

Embodiment 16: The method of embodiment 15 wherein the confidence interval is tuned according to a PER of the QoS flow.

Embodiment 17: The method of any of embodiments 1 to 16 wherein the one or more parameters comprise one or more parameters that indicate one or more statistical properties of the data burst volume of the QoS flow.

Embodiment 18: The method of embodiment 17 wherein the one or more statistical properties of the data burst volume of the QoS flow comprise an average data burst volume of the QoS flow, a variance of the data burst volume of the QoS flow, or both the average data burst volume and the variance of the data burst volume of the QoS flow.

Embodiment 19: The method of embodiment 17 or 18 wherein the one or more parameters that indicate the one or more statistical properties of the data burst volume of the QoS flow are provided as TSCAI.

Embodiment 20: The method of any of embodiments 1 to 19 wherein the one or more parameters comprise one or more parameters that indicate a distribution of the data burst volume of the QoS flow.

Embodiment 21: the method of any of embodiments 1 to 20 wherein the one or more parameters comprise one or more parameters that indicate a generalized conditional distribution of the data burst volume of the QoS flow with respect to a previous data burst volume of the QoS flow.

Embodiment 22: The method of any of embodiments 1 to 21 wherein the one or more parameters comprise one or more parameters that indicate a relative burst size in comparison to another burst data volume indication for the QoS flow.

Embodiment 23: The method of embodiment 22 wherein the other burst data volume indication is by MDBV, or by the minimum data burst volume.

Embodiment 24: The method of embodiment 22 wherein the other burst data volume indication is by observation, by the RAN node (500), of the actual burst data volume of all previous messages.

Embodiment 25: The method of any of embodiments 1 to 24 wherein the one or more parameters comprise one or more parameters that indicate a relative deviation from a minimum burst size indicated for the QoS flow.

Embodiment 26: The method of any of embodiments 1 to 25 wherein the one or more parameters comprise different parameter for different sub-flows (e.g., different TSN streams) of the QoS flow.

Embodiment 27: The method of any of embodiments 1 to 26 wherein the one or more parameters comprise one or more parameters related to aperiodic deterministic traffic for the QoS flow.

Embodiment 28: A method performed by core network, CN, node (502), the method comprising sending (504), to a Radio Access Network, RAN, node (500), one or more parameters, in additional to a maximum data burst volume, MDBV, parameter, that describe one or more data volume characteristics of a Quality of Service, QoS, flow.

Embodiment 29: The method of embodiment 28 wherein the QoS flow is a guaranteed bit rate, GBR, QoS flow.

Embodiment 30: The method of embodiment 29 wherein the GBR QoS flow is of a delay-critical resource type.

Embodiment 31: The method of embodiment 29 wherein the GBR QoS flow is of a non-delay-critical resource type.

Embodiment 32: The method of embodiment 28 wherein the QoS flow is a non-guaranteed bit rate QoS flow.

Embodiment 33: The method of any of embodiments 28 to 32 wherein receiving (504) the one or more parameters comprise receiving (504) the one or more parameters as Time-Sensitive Communication Assistance Information, TSCAI.

Embodiment 34: the method of any of embodiments 28 to 32 wherein receiving (504) the one or more parameters comprise receiving (504) the one or more parameters as one or more QoS parameters.

Embodiment 35: The method of any of embodiments 28 to 32 wherein receiving (504) the one or more parameters comprise receiving (504) at least one of the one or more parameters as Time-Sensitive Communication Assistance Information, TSCAI, and receiving (504) at least one other of the one or more parameters as at least one QoS parameter.

Embodiment 36: The method of any of embodiments 28 to 35 wherein the one or more parameters comprise a parameter that indicates a minimum data burst volume for the QoS flow.

Embodiment 37: The method of embodiment 36 wherein one or more QoS requirements associated to the QoS flow are applied to the minimum data burst volume rather than the MDBV.

Embodiment 38: The method of embodiment 36 wherein one or more QoS requirements associated to the QoS flow are applied to the MDBV.

Embodiment 39: The method of any of embodiments 28 to 38 wherein the one or more parameters comprise one or more parameters that indicate a data burst volume range of a next message on the QoS flow with respect to an actual size of a previous message on the QoS flow.

Embodiment 40: The method of embodiment 39 wherein the one or more parameters that indicate the data burst volume range of the next message on the QoS flow with respect to the actual size of the previous message on the QoS flow are configured according to a confidence interval.

Embodiment 41: The method of embodiment 40 wherein the confidence interval is tuned according to a PER of the QoS flow.

Embodiment 42: The method of any of embodiments 28 to 41 wherein the one or more parameters comprise one or more parameters that indicate one or more statistical properties of the data burst volume of the QoS flow.

Embodiment 43: The method of embodiment 42 wherein the one or more statistical properties of the data burst volume of the QoS flow comprise an average data burst volume of the QoS flow, a variance of the data burst volume of the QoS flow, or both the average data burst volume and the variance of the data burst volume of the QoS flow.

Embodiment 44: The method of embodiment 42 or 43 wherein the one or more parameters that indicate the one or more statistical properties of the data burst volume of the QoS flow are provided as TSCAI.

Embodiment 45: The method of any of embodiments 28 to 44 wherein the one or more parameters comprise one or more parameters that indicate a distribution of the data burst volume of the QoS flow.

Embodiment 46: The method of any of embodiments 28 to 45 wherein the one or more parameters comprise one or more parameters that indicate a generalized conditional distribution of the data burst volume of the QoS flow with respect to a previous data burst volume of the QoS flow.

Embodiment 47: The method of any of embodiments 28 to 46 wherein the one or more parameters comprise one or more parameters that indicate a relative burst size in comparison to another burst data volume indication for the QoS flow.

Embodiment 48: The method of embodiment 47 wherein the other burst data volume indication is by MDBV, or by the minimum data burst volume.

Embodiment 49: The method of embodiment 47 wherein the other burst data volume indication is by observation, by the RAN node (500), of the actual burst data volume of all previous messages.

Embodiment 50: The method of any of embodiments 28 to 49 wherein the one or more parameters comprise one or more parameters that indicate a relative deviation from a minimum burst size indicated for the QoS flow.

Embodiment 51: The method of any of embodiments 28 to 50 wherein the one or more parameters comprise different parameter for different sub-flows (e.g., different TSN streams) of the QoS flow.

Embodiment 52: The method of any of embodiments 28 to 51 wherein the one or more parameters comprise one or more parameters related to aperiodic deterministic traffic for the QoS flow.

Embodiment 53: A network node (700) adapted to perform the method of any of embodiments 1 to 52.

Embodiment 54: A network node (700) comprising processing circuitry (704; 804) configured to cause the network node (700) to perform the method of any of embodiments 1 to 52.

Those skilled in the art will recognize improvements and modifications to the embodiments of the present disclosure. All such improvements and modifications are considered within the scope of the concepts disclosed herein.

The invention claimed is:

1. A method performed by Radio Access Network (RAN) node, the method comprising:
   receiving, from a core network (CN) node, one or more parameters, in addition to a maximum data burst volume (MDBV) parameter, that describe one or more data burst volume characteristics of a Quality of Service (QoS) flow, wherein the one or more parameters comprise one or more parameters that indicate a distribution of the data burst volume of the QoS flow; and
   performing one or more operational tasks based on the one or more parameters.

2. The method of claim 1, wherein the one or more operational tasks comprises scheduling or allocating resources for a data radio bearer associated to the QoS flow.

3. The method of claim 1, wherein the QoS flow is a guaranteed bit rate (GBR) QoS flow.

4. The method of claim 3, wherein the GBR QoS flow is of a delay-critical resource type or of a non-delay-critical resource type.

5. The method of claim 1, wherein the QoS flow is a non-guaranteed bit rate QoS flow.

6. The method of claim 1, wherein receiving the one or more parameters comprise receiving the one or more parameters as Time-Sensitive Communication Assistance Information (TSCAI).

7. The method of claim 1, wherein receiving the one or more parameters comprise receiving the one or more parameters as one or more QoS parameters.

8. The method of claim 1, wherein receiving the one or more parameters comprise receiving at least one of the one or more parameters as Time-Sensitive Communication Assistance Information (TSCAI) and receiving at least one other of the one or more parameters as at least one QoS parameter.

9. The method of claim 1, wherein the one or more parameters comprise a parameter that indicates a minimum data burst volume for the QoS flow.

10. The method of claim 9, wherein one or more QoS requirements associated to the QoS flow are applied to the minimum data burst volume rather than the MDBV.

11. The method of claim 9, wherein one or more QoS requirements associated to the QoS flow are applied to the MDBV.

12. The method of claim 1, wherein the one or more parameters comprise one or more parameters that indicate a data burst volume range of a next message on the QoS flow with respect to an actual size of a previous message on the QoS flow.

13. The method of claim 12, wherein the one or more parameters that indicate the data burst volume range of the next message on the QoS flow with respect to the actual size of the previous message on the QoS flow are configured according to a confidence interval.

14. The method of claim 13, wherein the confidence interval is tuned according to a packet error rate (PER) of the QoS flow.

15. The method of claim 1, wherein the one or more parameters comprise one or more parameters that indicate one or more statistical properties of the data burst volume of the QoS flow.

16. The method of claim 15, wherein the one or more statistical properties of the data burst volume of the QoS flow comprise an average data burst volume of the QoS flow, a variance of the data burst volume of the QoS flow, or both the average data burst volume and the variance of the data burst volume of the QoS flow.

17. The method of claim 15, wherein the one or more parameters that indicate the one or more statistical properties of the data burst volume of the QoS flow are provided as TSCAI.

18. The method of claim 1, wherein the one or more parameters comprise one or more parameters that indicate a generalized conditional distribution of the data burst volume of the QoS flow with respect to a previous data burst volume of the QoS flow.

19. The method of claim 1, wherein the one or more parameters comprise one or more parameters that indicate a relative burst size in comparison to another burst data volume indication for the QoS flow.

20. The method of claim 19, wherein the other burst data volume indication is by MDBV, or by the minimum data burst volume.

21. The method of claim 19, wherein the other burst data volume indication is by observation, by the RAN node, of the actual burst data volume of all previous messages.

22. The method of claim 1, wherein the one or more parameters comprise one or more parameters that indicate a relative deviation from a minimum burst size indicated for the QoS flow.

23. The method of claim 1, wherein the one or more parameters comprise different parameters for different sub-flows of the QoS flow.

24. The method of claim 1, wherein the one or more parameters comprise one or more parameters related to aperiodic deterministic traffic for the QoS flow.

25. A Radio Access Network (RAN) node comprising processing circuitry configured to cause the RAN node to:
receive, from a core network (CN) node, one or more parameters, in addition to a maximum data burst volume (MDBV) parameter, that describe one or more data burst volume characteristics of a Quality of Service (QoS) flow, wherein the one or more parameters comprise one or more parameters that indicate a distribution of the data burst volume of the QoS flow.

26. A method performed by core network (CN) node, the method comprising:
sending, to a Radio Access Network (RAN) node, one or more parameters, in addition to a maximum data burst volume (MDBV) parameter, that describe one or more data burst volume characteristics of a Quality of Service (QoS) flow, wherein the one or more parameters comprise one or more parameters that indicate a distribution of the data burst volume of the QoS flow.

27. A core network (CN) node comprising processing circuitry configured to cause the network node to:
send, to a Radio Access Network (RAN) node, one or more parameters, in addition to a maximum data burst volume (MDBV) parameter, that describe one or more data burst volume characteristics of a Quality of Service (QoS) flow, wherein the one or more parameters comprise one or more parameters that indicate a distribution of the data burst volume of the QoS flow.

\* \* \* \* \*